No. 665,147.  
J. C. TATMAN.  
GARMENT STRETCHER.  
(Application filed Mar. 27, 1900.)  
(No Model.)  
Patented Jan. 1, 1901.
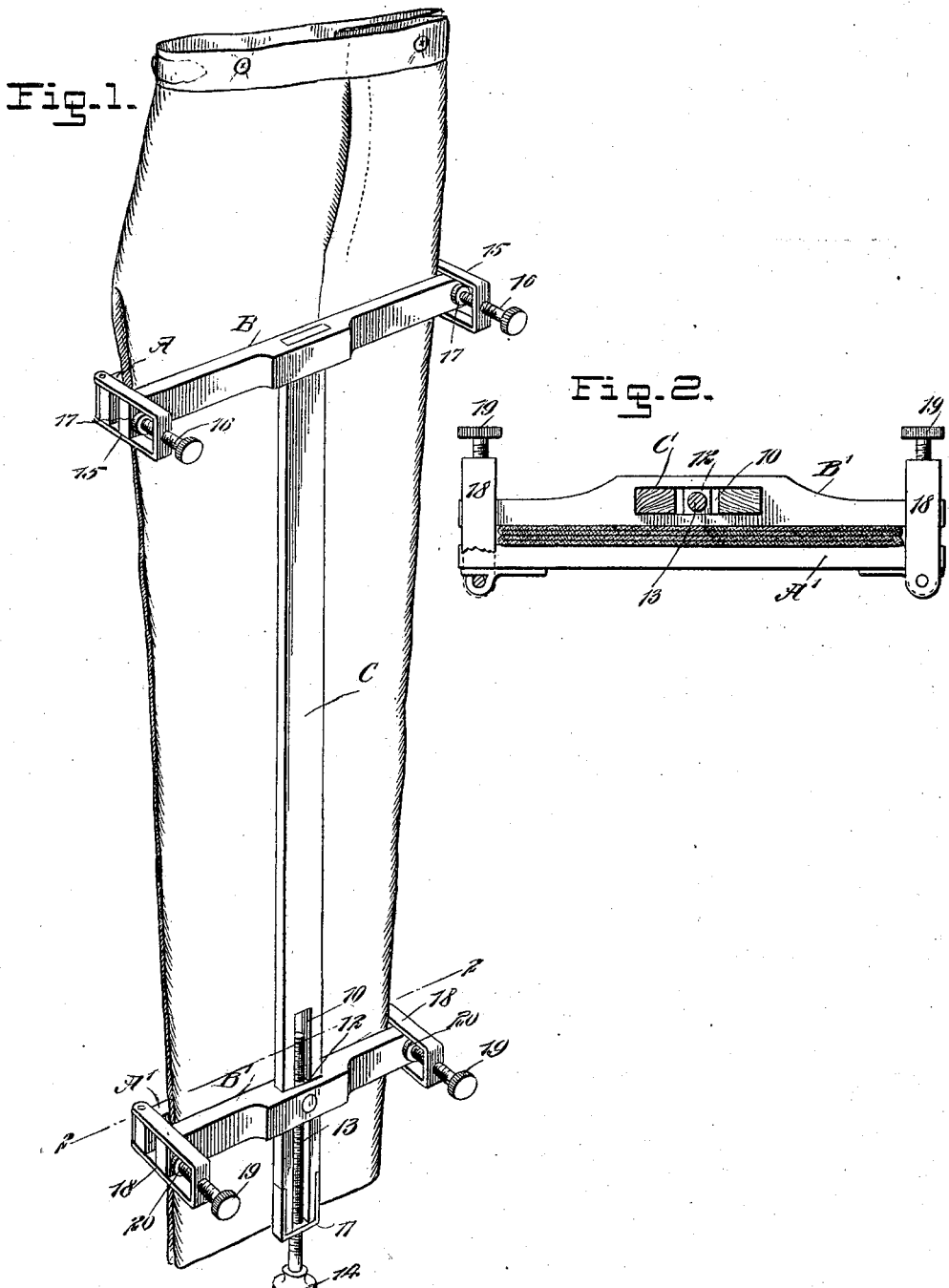
WITNESSES:  
INVENTOR  
ATTORNEYS.

UNITED STATES PATENT OFFICE.

JOHN COSGROVE TATMAN, OF VICTOR, COLORADO.

GARMENT-STRETCHER.

SPECIFICATION forming part of Letters Patent No. 665,147, dated January 1, 1901.

Application filed March 27, 1900. Serial No. 10,371. (No model.)

*To all whom it may concern:*

Be it known that I, JOHN COSGROVE TATMAN, a citizen of the United States, and a resident of Victor, in the county of Teller and State of Colorado, have invented a new and Improved Trousers-Stretcher, of which the following is a full, clear, and exact description.

One purpose of the invention is to provide a device particularly adapted for stretching trousers and preventing the legs from wrinkling when the trousers are hung up and to preserve or produce a longitudinal crease at the front and back of the trousers.

Another object of the invention is to so construct the device that it may be expeditiously and conveniently applied and adjusted to trousers of different lengths.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both figures.

Figure 1 is a perspective view of a pair of trousers and the improved device applied thereto, and Fig. 2 is a horizontal section taken on the line 2 2 in Fig. 1.

The device consists of two upper cross-bars A and B and corresponding but shorter lower cross-bars A' and B', and the cross-bars B and B' are connected by a longitudinal bar C, which is secured in any suitable or approved manner to the central portion of the upper cross-bar B and is mounted to slide in a suitable central opening made in the lower corresponding cross-bar B', as is illustrated in Fig. 1. The lower end of the longitudinal or connecting bar C is provided with a longitudinal slot or opening 10, and at the bottom of the longitudinal or connecting bar C the slot 10 is closed by a strap 11, preferably of metal. A nut 12 is located in the central portion of the opening in the lower cross-bar B', through which the connecting or longitudinal bar C passes, and this nut 12 is of such dimensions that it will loosely fit in the slot 10 in the connecting-bar C. A screw 13 is passed through the strap 11 and through the nut 12, and this screw is provided with a right and a left hand thread, one thread engaging a similar thread in the nut 12 and the other a corresponding thread in the strap 11. The screw 13 is provided with a suitable head 14 at its lower extremity.

Metal loops 15 are pivoted to the end portions of the upper cross-bar A, and these loops receive the ends of the corresponding upper cross-bar B. Each loop carries a screw 16, so arranged that said screws may be made to engage with metallic bearings 17, secured upon the outer face of the upper cross-bar B, at the end portions thereof; but these metal bearings 17 may be omitted, and the screws may be made to engage directly with the outer surface of said cross-bar. Similar loops 18 are pivoted to the ends of the lower cross-bar A', receiving the extremities of the opposing lower cross-bar B', and the loops 18 are provided with set-screws 19, adapted to engage with bearings 20, carried by the lower cross-bar B', near its extremities, or these bearings may be omitted, if desired.

In operation the set-screws 16 and 19 are loosened, so that the loops 15 and 18 may be carried outward to free the upper and lower cross-bars B and B'. These cross-bars B and B' are then made to engage with one side of a pair of trousers, the legs having been brought together to form a front and rear crease in them. The opposing upper and lower cross-bars A and A' are now brought in engagement with the other side of the pair of trousers, and the loops 15 and 18 are made to receive the extremities of the cross-bars B and B', whereupon the set-screws 16 and 19 are so manipulated that the trousers, just below the pockets and seat and at a point near the bottom, will be firmly clamped, respectively, between the upper and lower cross-bars A and B and A' and B'. The trousers may now be stretched lengthwise by manipulating the lower adjusting-screw 13, and the trousers thus stretched may be held under tension applied by the manipulation of the said lower set-screw.

Having thus described my invention, I claim as new and desire to secure by Letters Patent—

A trousers-stretcher consisting of upper and lower cross-bars, fastening devices for the ends of said bars, a connecting-bar attached to one of the upper cross-bars and upon which the corresponding lower cross-bar has sliding movement, said connecting-bar passing through a central opening in the said lower cross-bar and adapted to extend below the same, said connecting-bar being provided in its lower portion with a longitudinal slot, a strap closing the bottom of the opening, an adjusting-screw having a right and a left hand thread, said adjusting-screw engaging with a threaded opening in the strap, and a nut located in the central portion of the opening in the lower cross-bar in which the connecting-bar slides, said nut receiving the upper portion of the adjusting-screw, as set forth.

In testimony whereof I have signed my name to this specification in the presence of two subscribing witnesses.

JOHN COSGROVE TATMAN.

Witnesses:
JAMES E. DEVY,
GEORGE M. BASCOM.